June 4, 1968 W. C. SCUDDER 3,387,068
PROCESS FOR FORMING TRANSPARENT UNORIENTED
POLYAMIDE RESIN FILMS
Filed March 25, 1965 2 Sheets-Sheet 1

INVENTOR.
WILLIAM C. SCUDDER
BY
*Michael S. Janney*
ATTORNEY 3,387,068
PROCESS FOR FORMING TRANSPARENT
UNORIENTED POLYAMIDE RESIN FILMS
William C. Scudder, North Plainfield, N.J., assignor to Allied Chemical Corporation, New York, N.Y., a corporation of New York
Filed Mar. 26, 1965, Ser. No. 442,884
10 Claims. (Cl. 264—83)

The present invention relates to the production of novel transparent and haze-free unoriented nylon films having excellent mechanical properties.

Nylon (polyamide) resin films of improved transparency have been reported to be prepared by various melt-extrusion processes in the prior art. Rapid quench of the extruded resin into a medium such as cold water is disclosed to yield a transparent film. However, films prepared by rapid quenching in these media have a tendency to develop a surface haze which renders them unsuitable for various applications. Although the use of a brine solution as a quenching medium reportedly results in films practically free from surface haze, film production by this process is accompanied by numerous disadvantages. Since the brine solution must be washed from the film surface or rapidly dried to prevent subsequent surface hazing, the rate at which the film may be processed is greatly curtailed, thus resulting in impractical production on a commercial scale. In addition, thin films obtained from these rapid quench processes characteristically have a low level of crystallinity which results in a film of unacceptable mechanical properties.

Another rapid quench method used in the past to produce transparent nylon film involves extrusion of a thin sheet of molten nylon resin onto a cooled rotating roll without direct contact of the molten resin with quenching liquids. Although thin films produced by this method normally are relatively free of haze, the films possess a low crystallinity level which is manifested in a low yield strength and tensile modulus. Such weak films cannot be handled on rewinding, extrusion, coating, laminating, packaging or other equipment without being grossly stretched and distorted. Thus, their production as well as their application for the intended purpose is seriously hampered.

Accordingly, it is an object of this invention to provide transparent and substantially haze-free unoriented thin nylon films of high mechanical strength and a method for their preparation.

It is a further object to provide unoriented thin nylon films having a haze of less than 1.5 percent and a level of crystallinity in the gamma phase of at least 25 percent.

A still further object of the present invention is to provide a process for producing an unoriented thin film of less than 1.5 percent haze which is capable of being worked on rewinding, packaging and other equipment without excessive stretching or distortion.

In accordance with the invention transparent and substantially haze-free unoriented thin films of between about 0.4 and 2 mils thickness and possessing high mechanical strength may be prepared from molten polyamide resins by a process comprising the following steps:

(1) Extruding the molten resin at a temperature above its melting point onto a smooth moving support;

(2) Controlling the temperature of the support so that the extruded molten resin is cooled during its contact with the support to a temperature not greater than about 210° F. to form a coherent film;

(3) Subjecting said film to water vapor laden atmosphere at a temperature of at least about 125° F. for a time sufficient to obtain a film having a water content of 1.3 percent to 4.0 percent based on the weight of the film; and (4) Heating the moisturized film at a temperature of at least about 125° F. for a time sufficient to reduce the water content of the film to between 0.4 percent and 3.5 percent based on the weight of the film.

The thin nylon films obtained from the process of the present invention are transparent and substantially haze-free, glossy films. Moreover, the films possess outstanding mechanical properties. Thin nylon films having such a combination of desirable optical and mechanical properties are believed to be unobtainable by prior art methods.

By rapidly quenching molten nylon resin at a temperature not greater than 210° F. onto a smooth moving support, thin film having a low crystallinity level may be obtained. Such film possesses desirable optical properties such as high gloss, transparency and low haze. However, when exposed to the atmosphere at ambient conditions for a time sufficient to absorb small amounts of water, the strength and stability of such film becomes so poor that the film cannot be handled on rewinding, packaging or other equipment without being grossly stretched, distorted or creased. It was surprisingly found that the desirable combination of haze-free and excellent mechanical strength properties may be imparted to thin nylon films by subjecting the film obtained from the rapid quench process to a water vapor laden atmosphere at a temperature of at least about 125° F. for a time sufficient to obtain the film containing 1.3 percent to 4.0 percent of water based on the weight of the film and heating the moisturized film to a temperature of at least about 125° F. to reduce the water content of the film to between 0.4 percent and 3.5 percent based on the weight of the film. Such treatment of the film produces a high degree of crystallization in the film which imparts desirable mechanical properties to the film while preventing the growth of large crystalline aggregates which are believed to be responsible for haziness in the film.

The synthetic linear polyamide films prepared in accordance with the process of the present invention are composed of crystalline spherulites having an average diameter of not greater than about 2 microns which is believed to keep the haziness in these films to a minium, generally below 1.0 percent and in all instances below 1.5 percent. In addition, the crystalline structures of the films of the present invention posses a degree of crystallinity in the gamma phase of at least 25 percent and usually not more than 55 percent. This high degree of crystallinity enables the present films to attain excellent yield strength, tensile modulus and resistance to dimensional change. These films may be readily characterized by having, in the transverse and in the machine direction, at 72° F. and 50 percent relative humidity, a minum yield strength of at least 3,500 p.s.i., preferably at least 5,000 p.s.i.; a tensile modulus of no less than 40,000 p.s.i., preferably at least 80,000 p.s.i. when measured by standard test method ASTM #D–882–61T; and a dimensional change (percent shrinkage) of less than 3 percent, preferably not greater than 2 percent, when exposed for 30 minutes in an air circulating oven at 300° F. in accordance with standard test method ASTM #D-1204-54. These values are obtained immediately after the film resulting from the process is allowed to cool to the conditions at which these tests are carried out. By virtue of these outstanding mechanical properties, the nylon film of this invention may be readily handled on rewinding, packaging or other equipment without being distorted, creased or stretched.

The polyamide resins useful in the process of the instant invention to form films of improved mechanical and optical properties may be derived by methods well-known in the art. Typical methods for preparation of these nylon resins include the self-condensation of amino acids, reaction of diamines with dicarboxylic acids or by the thermal polymerization of epsilon caprolactam. Particularly suitable nylons are those prepared by the intra-molecular polymerization of the lactam of epsilon-aminocaproic acid and those obtained from the condensation of hexamethylenediamine and adipic acid. The polyamide resins suitable for melt extrusion in the present process normally have a "viscosity-average" molecular weight of at least 10,000, preferably between 15,000 and 40,000.

Extrusion of the polyamide resin may be effected by employment of any standard extrusion apparatus. The nylon may be fed to a screw of the extruder in granular, flake or any other conveniently supplied form. Since these polyamides are highly hygroscopic it is necessary that these materials be used without undue delay or re-dried before use if allowed to be stored or exposed to the atmosphere at a high relative humidity. Heat capacity of the extruder must be sufficient to melt the polyamide resin and maintain the temperature above the melting point of the resin generally between about 15° F. and 200° F. above the melting point of the resin, while being fed through the die orifice of the extruder. The die orifice normally is positioned approximately within ½-inch of the smooth moving support on which the molten resin is quenched and is so placed that the line of flow of the molten polymer through the die orifice onto the surface of said support facilitates good contact between the extruded polymer and the support. Generally, the die orifice makes an angle of less than 90° with the surface of the support at the point of intersection with the line of flow of the resin. The rate of extrusion, the width of the die orifice and the speed of the moving support may be widely varied and, as is understood by those skilled in the art, determine the thickness of the film obtainable. These parameters readily may be controlled to obtain film of a thickness of 0.4 to 2 mils which is the subject of the present invention. In general, the moving support is maintained at a higher speed than the linear velocity of the resin stream through the die orifice to obtain the desired film thickness. The ratios of the speed of the moving support to the linear velocity of the resin through the orifice may range from 5:1 to 100:1 but preferably ratios of about 10:1 to 40:1 have been found to be particularly desirable.

The molten resin is quenched by being permitted to flow out onto the cooled surface of the moving support at a rate sufficient to form a coherent film. Any standard quench apparatus may be adopted in the present process to quench the molten resin to the desired temperature. Casting drums, rolls or continuous belts may be conventionally employed to serve as a support and means for rapidly chilling the molten resin after its contact with the support. No criticality is attached to the nature of the supporting surface so long as the materials of construction employed are capable of being rapidly cooled and of cooling the molten resin to the desired temperature. The film is cooled without the use of a liquid since most liquids, including water, produce a surface haze in the film. However lubricants such as sodium stearate may be present in the extruded resin without deleterious effects. The rate of cooling of the molten resin to form a coherent film must be rapid during this step, preferably with 1 second, to avoid the formation of large spherulites which are believed to be responsible for the haze in the film. This is attained by maintaining the surface temperature of the moving support, for example by internal means, below about 210° F. Temperatures as low as 32° F. can be effectively used to produce a clear film when the resin does not contain a lubricant. When a lubricant is present in the extruded resin, it is desirable to operate at temperatures not less than about 70° F. to avoid formation of a white powder on the roll which may be transferred onto the film. As the film of present interest is of a maximum thickness in all cases of 2 mils, moving support and film temperatures are identical while the film is on the moving support. Residence time of the film on the moving support should not exceed 3 seconds at temperatures between 120° F. and 210° F. to avoid formation of undesired large spherulites. At temperature below 120° F., residence item of the film on the moving support is not critical in obtaining a film having spherulites of an average diameter of not greater than 2 microns.

After the molten resin has been cooled to a temperature below about 210° F. to form a film of the desired thickness, the film is exposed to a water vapor laden atmosphere for a time sufficient to permit absorption of not less than 1.3 percent nor more than 4.0 percent of water based on the weight of the film. The film may be subjected to the water vapor laden atmosphere while on the moving support or after being removed from the quench apparatus. The temperature and time at which the film is subjected to the water vapor laden atmosphere are not critical so long as the film is moisturized to the extent indicated. Since water vapor is necessary to effect moisturization of the film, temperatures in excess of about 125° F. are normally required. The water vapor laden atmosphere contemplated herein may be present in the form of a fine spray mist or as hot water vapor up to about 212° F. at atmospheric pressure. Preferably, the water vapor laden atmosphere is saturated steam at a temperature of about 190° F. to about 212° F. The amount of water absorbed by the film is dependent upon the relative humidity maintained in the moisturization chamber and the rate of film travel through the chamber. Since the rate of film travel through the moisturization chamber is quite rapid, a zone of high relative humidity, generally at least 50 percent and usually about 80 percent to 100 percent is required to permit for sufficient absorption of the desired quantity of water.

The moisturized film containing 1.3 to 4.0 percent water is heated to a temperature of at least 125° F. under conditions which effect little drying, usually reducing the water content of the moisturized film by not more than about 1.5 percent. After heating, the film should contain not less than about 0.4 percent and not more than about 3.5 percent water based on the weight of the film. Below about 0.4 percent water content, the crystalline film tends to develop haze and brittleness. Heating of the moisturized film under these conditions produces a film having a high degree of crystallization which is responsible for the superior mechanical properties characteristic of the film of this invention. By treating the moisturized film obtained from the rapid quench process in this manner, crystallization of the film to an extent of at least about 25 percent, normally not greater than about 55 percent, in the gamma phase is obtained with the formation of spherulites having an average diameter of no more than about 2 microns. Temperatures in the range of 200° F. to 250° F. have been found particularly suitable to effect this controlled drying procedure but the maximum temperature employable is limited only by the melting point of the resin. Moisturization and heating of the film are preferably conducted in separate zones to more readily control the water content of the film. Alternatively, heating of the moisturized film may be carried out at the outlet end of the same zone wherein the film is moisturized. Since it is only required that the water content of the film be controlled to the extent indicated in this step of the process, the film may be heated by any conventional heating device such as heated hot rolls, infrared heaters, the moisturizing medium itself or by any combination of these or other conventional heating methods.

After drying the film to the indicated extent, the film is wound up through a pair of nip rolls which control the rate of takeoff of the film from the moving support and the rate of film travel through the moisturizing and heating zones, to a wind-up roll which is operated at a peripheral surface speed slightly greater than the surface speed of the moving support on which the molten film is quenched. The film is wound up at a rate of at least about 20 feet per minute, the maximum wind-up speed being limited only by the nature of the equipment employed, generally about 500 feet per minute.

The crystalline index (degree of crystallinity) in the gamma phase of the film of the present invention is determined immediately after the film is drawn from the nip rolls. By use of an X-ray diffractometer, diffraction patterns with copper K alpha radiation between specified $2\theta$ angles are obtained by scanning specimens, mounted in the diffractometer in the para focusing position, of nylon film completely in the amorphous state and of nylon film produced by the process of the present invention. The X-ray diffraction curves of the amorphous and subject films are normalized after removal of instrumental and incoherent scattering backgrounds. The net X-ray intensity is termed the ordinate and the $2\theta$ angle is designated as the abscissa. The ordinate of highest intensity is considered unity, thereby enabling preparation of a table of ordinate ratios at their respective $2\theta$ angles. Employing the amorphous ordinate factor for that particular $2\theta$ angle, the shape of the amorphous curve is fitted under the shape of the experimental curve of the subject film so that the intensities of the amorphous and experimental curves above the instrumental and incoherent scattering coincide at angles free of crystalline influence. After measuring the net area of the experimental diffraction curve between $2\theta$ angles $3°$ to $40°$ and the net area of the adjusted amorphous shape of the experimental curve, the crystalline index may be determined by the following formula:

Crystalline Index =

$$\frac{[\text{Total Area} - \text{Amorphous Area}]}{\text{Total Area}} \times 100$$

Apparatus for operating the process hereinbefore described comprises means for extruding molten film, means for rapidly quenching the extruded film, means for moisturizing the film, rollers on which the film is supported while being processed through the moisturization and heating steps of the process and a pair of contra-rotatable nip rolls.

Figure 1:
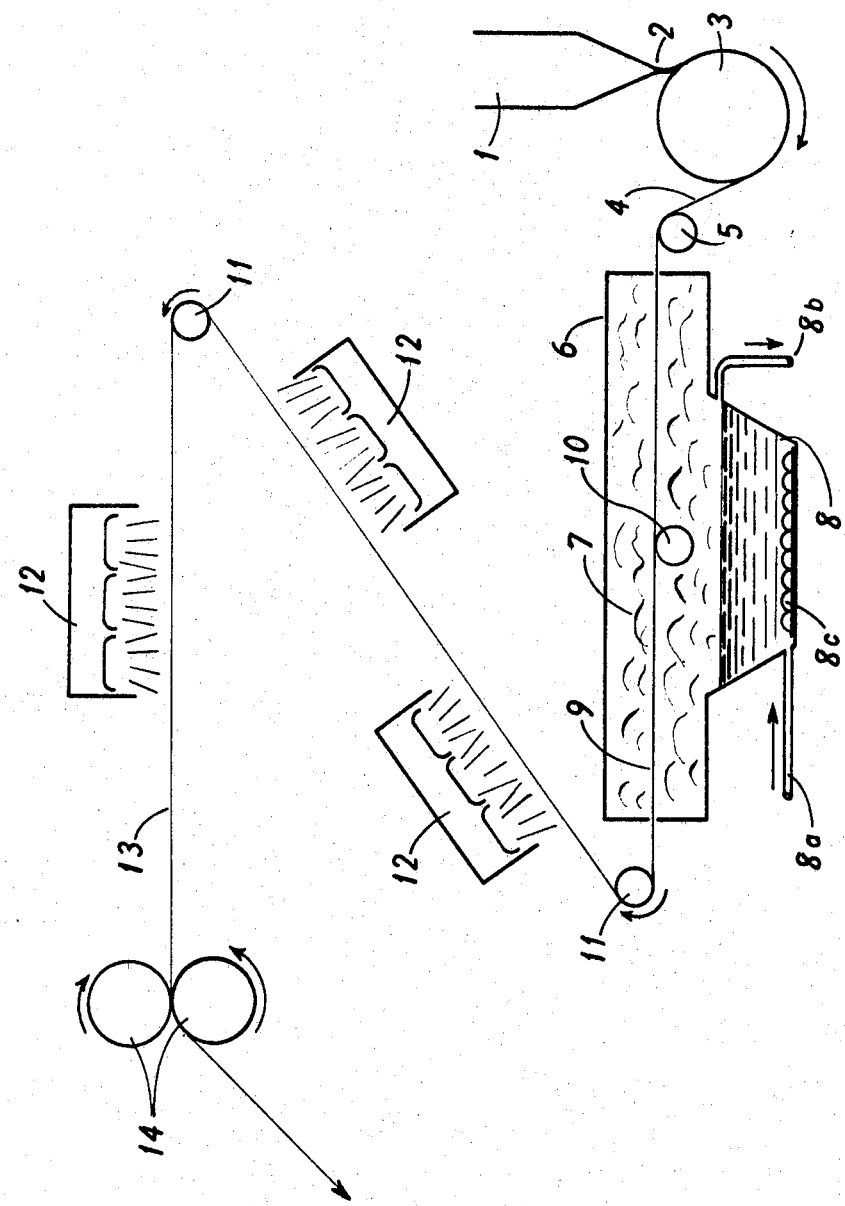
FIGURE 1 is a diagrammatic view of one form of apparatus useful in carrying out the process of this invention.

FIGURE 1 illustrates a process wherein the extruded film is quenched and moisturized in separate zones and subsequently heated by means of infrared heaters. In this drawing, 1 is a film die provided with a die orifice 2 through which the molten resin flows to the face of a quenching drum 3. The quenched film 4 is passed over roller 5 into moisturization chamber 6 provided with hot water vapor atmosphere 7 supplied by hot water bath 8. Hot water bath 8 is supplied with hot water through feed pipe 8a, the water level being maintained by overflow pipe 8b. The temperature of the water in the bath is controlled by immersion heaters 8c. The moisturized film 9 supported by roller 10 is withdrawn from chamber 6 and is exposed to three infrared heaters 12 which are positioned above the film surface. Idler rolls 11 are provided around which the film travels while being exposed to the heaters 12. The heated film 13 is passed through the nip of a pair of contra-rotatable rollers 14 and then to a wind-up roll (not shown) which is rotated at a peripheral surface speed slightly greater than the speed of rotation of the quench roll 3 to maintain sufficient tension on the film and to eliminate sagging and wrinkling while in the chamber 6 and under the heaters 12.

Figure 2:
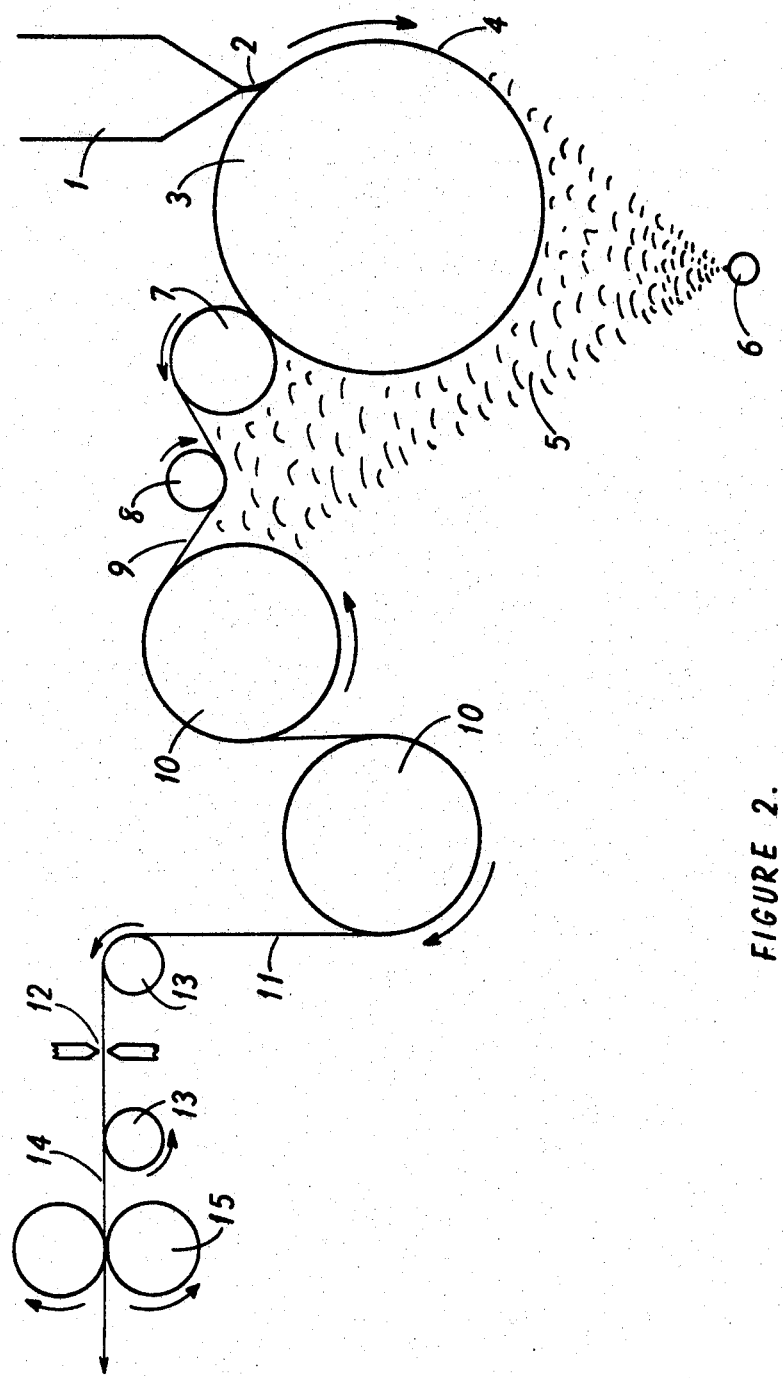
FIGURE 2 is a similar view of an alternative arrangement of apparatus.

FIGURE 2 illustrates a process wherein the extruded film is quenched and moisturized in the same zone and subsequently heated by means of internally heated rolls. In this drawing, 1 is a film die provided with a die orifice 2 through which the molten resin flows to the face of a quenching drum 3. The quenched film 4 is exposed to hot water vapor atmosphere 5 supplied by steam sparge pipe 6 while on drum 3, stripper roll 7 and idler roll 8. The moisturized film 9 is passed over heater rolls 10 provided with internal cooling means (not shown). The heated film 11 exiting from heater rolls 10 is drawn to trim station 12 while being supported by idler rolls 13. The trimmed film 14 is passed through the nip of a pair of contra-rotatable rollers 15 and then to a wind-up roll (not shown) which is rotated at a peripheral surface speed slightly greater than the speed of rotation of the quench drum 3.

The following examples illustrate specific applications of the afore-described process. It is to be understood that these examples are for the purpose of illustration only and that the invention is not to be regarded as limited in any way to the specific conditions or apparatus cited therein.

EXAMPLE I

A sample of molten polyepsilon caprolactam nylon resin having a "viscosity-average" molecular weight of 20,000 to 22,000 measured in m-cresol at 0.13 g./25 ml. at $25 \pm 0.1°$ C. was formed into film by use of the apparatus shown in FIGURE 1. The molten resin, containing 0.1 percent sodium stearate as lubricant, was extruded at a temperature of 495° F. through a die orifice measuring $24'' \times 0.020''$ of a standard screw extruder. The molten resin was quenched to a coherent film by being drawn downward onto a rotating chromium plated steel drum which was maintained at a temperature of 200° F. The die orifice was located approximately $\frac{1}{4}''$ between the drum and the opening of the die orifice through which the molten resin passes and the drum, $12.5''$ in diameter, was cooled by continuous circulation of cold water through its interior. The line of flow of resin through the orifice made an angle of approximately 45° with the tangent to the drum at the point of intersection. The drum was rotated at a peripheral speed of 105 feet per minute thereby drawing the melt to a thickness of $0.0005''$. The 0.5 mil film, was stripped from the drum after making approximately $\frac{3}{4}$ of a revolution in contact with the drum and had a water content of 0.04 percent based on the weight of the film.

After being stripped from the drum, the quenched film was passed directly into a water vapor filled chamber which was maintained at a relative humidity of 100 percent at a temperature of 200° F. and atmospheric pressure by means of a hot water bath. The film emerging from the chamber had a water content of 2.7 percent based on the weight of the film.

After exiting from the hot humid chamber the film was exposed to ambient temperature and humidity (80° F. and 21 percent R.H.) for a distance of 42 inches before being subjected to the first of three infrared heaters. The heaters, positioned approximately $6''$ above the film surface, were distributed along the web path such that the second heater was separated from the first by a distance of 18 inches and the third heater was separated from the second by a distance of 6 inches. The total web length between the first and third heaters was 24 inches. The heaters were rated at 41, 18 and 11 watts per square inch and emitted at a 2.8, a 3.7 and a 4.2 micron peak energy wave length, respectively. The temperature of the film ranged from 210° F. to 240° F. during its passage under the heaters. After exiting from the third heater the film had a water content of 1.9 percent. The film was drawn between a pair of contra-rotatable nip rolls and was wound onto a wind-up roll which was rotated at a peripheral surface speed of about 2 percent greater than the speed of rotation of the drum on which the film was quanched. The 0.5 mil film produced possessed excellent optical and mechanical properties which are summarized in Table I below.

EXAMPLE II

The molten polyepsilon caprolactam nylon resin of Example I was formed into an 0.8 mil film by using the apparatus shown in FIGURE 1. Extrusion of the resin was effected at a temperature of 492° F. onto a rotating chromium plated steel drum maintained at 85° F. The drum was rotated at a peripheral speed of 101 feet per minute thereby drawing down the melt to a thickness of 0.0008″. The quenched 0.8 mil film stripped from the drum had a water content of 0.06 percent based on the weight of the film. The film was then passed into a water vapor filled chamber which was maintained at the conditions specified in the preceding example. The moisturized film exiting from the chamber had a water content of 2.3 percent based on the weight of the film.

After exiting from the hot humid chamber the film was exposed to ambient temperature and humidity (75° F., 25% R.H.) for a distance of 6 inches before passing over the first of three infrared heaters which are distributed along the web path such that the second heater was separated from the first by a distance of 36 inches and the third heater separated from the second by a distance of 18 inches. The total web length between the first and third heaters was 54 inches. Each heater was rated at 18 watts per square inch and emitted at a 3.7 micron peak energy wavelength. After exiting from the third heater the film had a moisture content of 1.6 percent. The film was drawn between a pair of nip rolls and was wound onto a roll. The exceptional optical and mechanical properties of the 0.8 mil film produced are summarized in Table I.

EXAMPLE III

The procedure outlined in Example II was repeated except that the melt was drawn down to a thickness of 0.0020 inch by rotating the drum at a peripheral speed of 50 feet per minute. The film stripped from the drum, containing 0.05 percent water, was moisturized to a water content of 1.51 percent and dried to a water content of 1.1 percent. The outstanding optical and mechanical properties of this 2 mil film are tabulated below.

TABLE I

| | Film Source | | |
|---|---|---|---|
| | Ex. I | Ex. II | Ex. III |
| Spherulite Size (Average Diameter in microns) | (1) | (1) | (1) |
| Transparency [2] (percent haze) | 1.4 | 0.5 | 0.6 |
| Crystalline Index [3] (percent of the film in the gamma crystalline phase) | 38 | 33 | 26 |
| Gloss [4] | 94 | 100+ | 100+ |
| Yield Strength, [5] MD | 7,500 | 5,400 | 5,600 |
| (P.s.i.) TD | 8,200 | 5,800 | 5,900 |
| Tensile Modulus, [6] MD | 103,000 | 85,000 | 91,000 |
| (P.s.i.) TD | 107,000 | 90,000 | 92,000 |
| Dimensional Change [7] (percent shrinkage) | 1.7 | 1.5 | 1.5 |

[1] 2 or less.
[2] Determined by ASTM D 1003–61 using a General Electric recording spectrophotometer.
[3] Obtained from experimental X-ray diffraction curves having a single crystalline peak at $2\vartheta=21.6°$ between $2\vartheta$ angles of 3° to 40°. Copper K alpha radiation under a potential of 35 kv. and 30 ma. was employed using a Norelco X-ray diffractometer with scintillation counter. The diffracted X-ray beam was filtered by nickel and made monochromatic by pulse height selection.
[4] Determined by ASTM D 523–62T using a 20° Gardner Gloss Meter (plain black glass standard 2C-1216).
[5] Determined by ASTM D 882–61T.
[6] Determined by ASTM D 882–61T.
[7] Determined by ASTM D 1204–54.

The present invention thus provides thin nylon haze-free films having excellent mechanical properties. The films of this invention are useful, for example, in the packaging of various articles such as in wrapping foods, paper cartons, articles of clothing, etc., where it is desirable to have the combination of transparency and high mechanical strength. In addition, the nylon films possess outstanding properties such as excellent abrasion, oil and grease resistance and impermeability to gases or vapors as compared with film composed of other thermoplastic materials.

While in the foregoing specification this invention has been described in relation to certain specific embodiments thereof and details have been set forth for the purpose of illustration, it may be apparent to those skilled in the art that the invention is adoptable to other embodiments and many of the details set forth herein may be varied considerably without departing from the basic concept of the invention. For example, the molten nylon resin may be extruded as a coating in accordance with the process of the present invention onto a suitable substrate such as films of polyethylene, polyvinyl chloride, polyethylene terephthalate or other thermoplastic material to form laminates having properties offering distinct advantages over films composed of the substrate materials alone.

I claim:

1. A process for preparing transparent, substantially haze-free unoriented films of 0.4 to 2 mil thickness having high mechanical strength from a molten polyamide resin which comprises:
   (1) extruding the molten resin at a temperature above its melting point onto a smooth moving support;
   (2) controlling the temperature of the support so that the molten resin is cooled during its contact with the support to a temperature not greater than about 210° F. to form a coherent film;
   (3) subjecting the film to water vapor laden atmosphere at a temperature of at least about 125° F. for a time sufficient to obtain a film having a water content of 1.3 percent to 4.0 percent based on the weight of the film; and
   (4) heating the moisturized film at a temperature of at least about 125° F. for a time sufficient to reduce the water content of the film to between 0.4 percent and 3.5 percent based on the weight of the film.

2. The process as defined in claim 1 wherein the molten polyamide resin is obtained by the intra-molecular polymerization of epsilon caprolactam.

3. The process as defined in claim 1 wherein the molten polyamide resin is obtained by the condensation of hexamethylenediamine and adipic acid.

4. The process as defined in claim 1 wherein the moisturized film is heated to remove no more than about 1.5 percent of the water content of the moisturized film based on the weight of the film.

5. The process as defined in claim 1 wherein the extruded film is cooled, moisturized and heated in separate zones.

6. The process as defined in claim 1 wherein the extruded film is cooled and moisturized in the same zone and heated in a separate zone.

7. The process as defined in claim 1 wherein the water vapor laden atmosphere is hot water vapor at a temperature of 125° F. to 212° F. and the moisturized film is heated to temperatures between 212° F. and the decomposition temperature of the film.

8. The process as defined in claim 1 wherein the water vapor laden atmosphere is saturated steam at a temperature of 190° F. to 212° F. and the moisturized film is heated to temperatures between 212° F. and the decomposition temperature of the film.

9. The process as defined in claim 7 wherein the moisturized film is heated to remove no more than about 1.5 percent of the water content of the moisturized film based on the weight of the film.

10. The process as defined in claim 8 wherein the moistured film is heated to remove no more than about 1.5 percent of the water content of the moisturized film based on the weight of the film.

References Cited

UNITED STATES PATENTS

| | | |
|---|---|---|
| 1,970,388 | 8/1934 | Menzel. |
| 2,867,004 | 1/1959 | Levison et al. |
| 2,934,788 | 5/1960 | Holt. |
| 3,039,142 | 6/1962 | Zavasnik. |
| 3,194,863 | 7/1965 | Williams. |
| 3,222,191 | 12/1965 | Steiner. |

DONALD J. ARNOLD, *Primary Examiner.*